Dec. 16, 1958 C. A. DE GIERS 2,864,981
COMPENSATING CAPACITOR
Filed Aug. 14, 1956
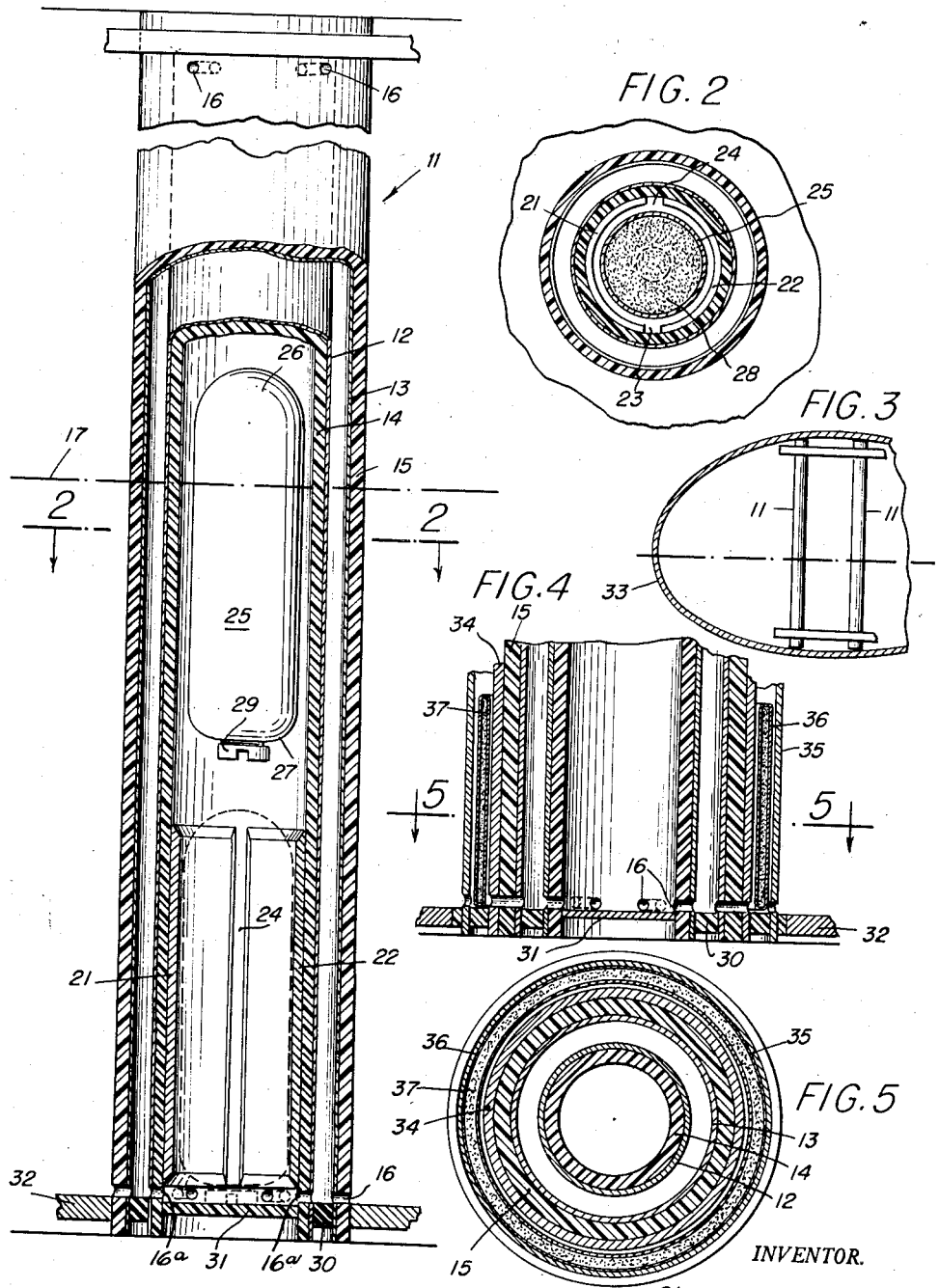

United States Patent Office 2,864,981
Patented Dec. 16, 1958

2,864,981

COMPENSATING CAPACITOR

Clarence A. de Giers, Roslyn, N. Y., assignor to The Liquidometer Corporation, Long Island City, N. Y., a corporation of Delaware Application August 14, 1956, Serial No. 603,972

7 Claims. (Cl. 317—246)

This invention is concerned with a capacitor for use in a liquid level measuring system. More specifically, a capacitor according to this invention includes a dielectric-material float, particularly for use in a system in which the capacitor is intended always to be immersed in a liquid so that the space between its plates is intended always to be filled with the liquid. In the event that the liquid does not so fill this space between the plates, then the float according to this invention acts automatically to replace the liquid when it is absent from between the plates of the capacitor.

In certain liquid level measuring systems employing capacitors that have their plates extending into the liquid, the level of which is being measured, use is made of compensating capacitors which are located so as to be always immersed in the liquid, for providing compensation to take care of variations in the dielectric constant of the particular batch of liquid being measured. Such a liquid level measuring system is fully described in a patent to Edelman, Re. 23,493, issued May 20, 1952, and assigned to the same assignee as this application. Such a measuring system is highly accurate and satisfactory so long as the compensating capacitor or capacitors remain entirely submerged in the liquid. One use for such a liquid level measuring system, however, is that of fuel tanks for aircraft. In this case, since the fuel tanks are multiple in numbers and may be located in the wings and fuselage as well as at the wing tips, etc., it often becomes very difficult for any given tank to maintain the compensating capacitors totally immersed. For example, due to rough air, various maneuvers, etc., it has been found that some of the compensating capacitors will be drained of fuel at times even though the tank is not empty. Obviously this will cause considerable inaccuracies and render the benefits of a compensated measuring system substantially nullified.

In other words, a compensated liquid level measuring system, like that of the Edelman patent mentioned above, will include errors in its indications if the compensating capacitors are intermittently in and out of the fuel or liquid in the tank. By making use of this invention, however, these errors may be held to a tolerable minimum.

Consequently it is an object of this invention to provide a compensating capacitor for a system, where the dielectric of the fluid, the level of which is being measured, includes a compensation for variations in the dielectric constant of the fluid; so that the system will continue to operate satisfactorily and without undue errors, even when the fluid flows out from between the plates of such compensating capacitor.

Another object of this invention is to provide a compensating capacitor employing a dielectric-material float therewith, which float is confined so as to act to take the place of the fluid normally between the plates of the capacitor, whenever the level of such fluid falls below the plates. In this manner the electrical capacity of the capacitor remains quite close to the same value.

Briefly, the invention includes a compensating capacitor for use in a non-gaseous fluid quantity-measuring system, such system being one wherein specific fluids to be measured will vary from one another in dielectric constants over a given range. The compensating capacitor comprises, among other elements, opposite polarity plates of conducting material adapted normally to be completely immersed in said fluid so that the fluid acts as a dielectric therefor; also, float means for replacing said fluid dielectric with a material having a fixed dielectric constant in the same range as the dielectric constant of the fluid being measured; also, means for confining said float means so that whenever the fluid level falls below the top of said plates, the float means will enter the space between the plates and provide a dielectric that is in the same range as the fluids to be measured.

Certain modifications of a capacitor according to this invention are described below and shown in the drawings, by way of illustration, in which:

Fig. 1 is an elevation partly in vertical section, showing a compensating capacitor in conjunction with a measuring capacitor unit;

Fig. 2 is a cross-sectional view taken along the line 2—2 of Fig. 1;

Fig. 3 is a fragmentary sectional view of a tank showing a pair of capacitor units located therein;

Fig. 4 is a fragmentary vertical sectional view of a modification of the float and compensating capacitor arrangement; and Fig. 5 is a horizontal sectional view taken along the line 5—5 of Fig. 4.

Referring to Fig. 1, it will be observed that a measuring capacitor unit 11 is shown broken away to a longitudinal vertical section so as to illustrate the interior construction. Such a unit is made up of a measuring capacitor having conducting material plates 12 and 13 formed in concentric cylindrical arrangement, adjacent to one another. These plates 12 and 13 may take various forms, for example, that illustrated, wherein these plates are formed by metalizing the outer and inner surfaces respectively of concentric insulating material tubes 14 and 15. The capacitor thus formed by the plates 12 and 13 extends from the bottom of a container (not shown in Fig. 1) for the liquid, the level of which is to be measured, to the top thereof. There are a plurality of holes 16 near the top and bottom of the tubes 14 and 15 in order to allow the liquid to flow into and out of the space between the tubes 14 and 15, and maintain the same fluid or liquid level as the level of fluid or liquid in the container. It will be observed that in the drawing there is an indication of the level of fluid or liquid at a line 17.

Variations in the level of the fluid or liquid will cause variations in the capacity of the measuring capacitor that is made up of the plates 12 and 13, and an indication of the level of the liquid may be had, for example, by means of a system in accordance with the Edelman patent referred to above. In such a system there is employed a compensating capacitor that has its plates always submerged in the liquid, the level of which is being measured. In Fig. 1 such a compensating capacitor is composed of a pair of conducting material plates 21 and 22, that are arcuate-shaped in horizontal cross-section so as to be located in a compact manner within the tube 14, at the lower extremity thereof. Each of these plates 21 and 22 is almost semi-circular in cross-section as may be observed in Fig. 2, there being two gaps 23 and 24 separating these two plates, in order electrically to insulate one from the other.

The compensating capacitor according to this invention includes a dielectric material float 25 that may take any convenient form. One structure that is illustrated in Figs. 1 and 2 is that of a hollow cylindrical body having relatively rounded ends 26 and 27, in order to allow a free movement of the float 25 up and down within the inner tube 14. It is contemplated that in the space within the float 25 there will be introduced, in a powder form or otherwise, a dielectric material 28 that may be made up to have a predetermined dielectric constant. The float 25 may also be constructed in a permanently sealed manner, but as illustrated, there is provided an opening in the bottom of the rounded end 27. This opening in the end 27 of the float may be closed for sealing the float, by means of a threaded cap 29.

The unit 11 may be conveniently supported in the container for the liquid or other fluid to be measured, in any desired manner. For example, there is an insulating-material ring 30 separating the tubes 14 and 15, and an insulating material disc 31 within tube 14 near the bottom thereof. These elements then give support to the elements of the unit 11, which may be supported within the container by a suitable member 32.

It will be appreciated that, as illustrated in Fig. 3, there may be employed more than one measuring capacitor unit 11 within a tank 33. This is merely illustrative of one particular use for a measuring capacitor unit according to this invention.

In Figs. 4 and 5, another embodiment of the invention is illustrated, wherein the measuring condenser elements are identical with those of the unit 11 illustrated in Figs. 1–3 and the same reference numbers are employed. In this embodiment, the compensating capacitor is constructed with one of its plates in the form of a cylinder 34 located around the outside of the outer tube 15 of the measuring condenser. The other plate of the compensating capacitor is a concentric cylinder 35 having the same axial dimension as plate 34, and being located with a predetermined spacing radially therefrom. In this modification the dielectric material float is in the form of a hollow ring 36 which is proportioned so as substantially to fill the space between the plates 34 and 35 of the compensating capacitor, but is freely movable in a vertical direction in response to the level of the fluid or liquid material in which it floats.

The float 36 may be constructed of any suitable solid material, if the specific gravity thereof is such that the desired floating action will be had and at the same time the desired dielectric constant for such material may be provided.

In the form illustrated for float 36 there is a hollow space within the outer walls thereof, that may be filled with a powder or other form of dielectric material 37 in like manner as the dielectric material 28 of the float 25 illustrated in the first-described embodiment above. It will be noted that in Fig. 4 the float 36 is illustrated as resting on the bottom of the unit and substantially filling the space between the plates 34 and 35. It will be appreciated that whenever the level of the fluid being measured rises above the tops of the compensating capacitor plates 34 and 35, the float 36 will rise by being floated in the liquid. At the same time the float 36 is guided and retained in position for again entering the space between the plates, by reason of its location around the outside of the tube 15.

Operation

The various elements according to this invention may be more clearly set forth by a short description of the operation of a capacitor in accordance therewith.

Referring to Fig. 1, it is pointed out that in the form illustrated, the level of a non-gaseous fluid that is being measured stands at the height indicated by dashed line 17. For this reason the float 25 is being buoyed up and floatably supported in the illustrated full line position, within the tube 14. Now, whenever the level of the fluid falls below the top of plates 21 and 22 of the compensating capacitor for any reason, the float 25 will fall also, with such drop in the level of the fluid, and enter more or less into the space between plates 21 and 22 that was formerly occupied by the fluid, the level of which was being measured. Passages 16a are provided as shown in the lower end of the tube 14, so that the fluid being measured normally exists inside the tube 14 up to the same level as outside the tube 13 and in the annular space between the tubes 13 and 14. The extreme condition is illustrated by the dotted line showing of float 25 resting on the bottom of the structure supporting measuring capacitor unit 11. Thus the action is such that upon any abnormally low level of the fluid being measured, such that it does not completely fill the space between the plates 21 and 22, the float 25 will move downwardly into this space to replace the fluid being measured, by a dielectric material (float 25) that has close to the same dielectric constant as the fluid. Consequently no substantial change in the capacity of compensating capacitor made up of plates 21 and 22 will take place upon the loss of fluid therebetween. It will be appreciated that all the fluids, the levels of which are to be measured, will have dielectric constants within a given range of values; and the dielectric constant of the float 25 will be made up so as to equal a mean value for such range.

In the modification according to Figs. 4 and 5, the same principles apply and the action is such that so long as the fluid, the level of which is being measured is normally above the top of plates 34 and 35 of the compensating capacitor, the float 36 will be buoyed up so as to be located above these plates and thus will have no effect upon the capacitance therebetween; while allowing the fluid to fill the space and act as the sole dielectric. Whenever for any cause the fluid level falls below the tops of the plates 34 and 35 of the compensating capacitor, float 36 will fall down and enter the space between the plates 34 and 35 so as to provide a substitute dielectric material, the dielectric-value of which is determined in advance. Thus, the capacity of the compensating capacitor is kept from varying to the extreme it otherwise would, and the errors which would otherwise be created are minimized.

It will be noted that many modifications of this invention might be employed without departing from the spirit thereof. For example, the plates of the compensating capacitor might be flat, parallel, conducting-material plates, so long as the float is constructed in a manner which will properly fill the space therebetween upon the absence of fluid, the level of which is to be measured. Furthermore, in the illustrated embodiments, the structure of the measuring condenser unit 11, in conjunction with the floats 25 or 36, is such that the floats 25 or 36 are always confined in the body of fluid such that upon an abnormal lowering of the fluid level, at the location of the compensating capacitor, the floats 25 or 36 will always fall directly between the plates of the compensating capacitor.

While certain embodiments of the invention have been described in considerable detail in accordance with the applicable statutes, this is not to be taken as in any way limiting the invention, but merely as being descriptive thereof.

It is claimed:

1. A capacitor for measuring the dielectric constant of various fluids in which it may be immersed from time to time, comprising fixed, spaced, opposite polarity plates of conducting material positioned so as normally to be completely immersed in one of said fluids, so that the ambient fluid acts as a dielectric therefor, and float means floatingly supported by said one fluid and normally held by the level of the fluid in which it is floating above the space between said plates but movable upon an abnormal lowering of the fluid level into the space between said plates to provide a fixed dielectric for the capacitor constituted by said plates, means guiding and constraining said float means to movement between a lower position in which it is located between said plates so as substantially to constitute the dielectric of said capacitor including said plates and an upper position wholly above said plates, said float means having a dielectric constant in the same range of values as the values of the dielectric constants of the fluids being measured from time to time.

2. A capacitor in accordance with claim 1 for measuring the dielectric constants of various fluids in which it may be immersed from time to time and in which the dielectric constants of the fluids to be measured all fall within a predetermined range, in which the dielectric constant of said float means is such as to be equivalent in the capacitance value of said capacitor to that one of said various fluids having a dielectric value midway of said range.

3. A capacitor having spaced, opposite polarity plates positioned in a container of a fluid, so as normally to be below the level thereof, the fluid normally occupying the space between said plates and serving as a fluid dielectric, but subject to the fluid flowing out from between the plates upon the abnormal dropping of the fluid level in the container, comprising a float having a bulk density such that it will float in said fluid, and means for guiding the movements of said float to cause it to enter the space between said plates whenever the fluid level drops to an extent such that said fluid flows out from the space therebetween, said float having dielectric characteristics such that the capacity of said capacitor when said float is located in the space between said plates will be approximately equal to the capacitance thereof with said fluid occupying all the space between said plates.

4. A capacitor in accordance with claim 3, in which said float is shaped so as substantially to fill the space between said plates when said fluid is absent from this space, and in which said float is hollow and contains material for adjusting the dielectric constant thereof to a value substantially equivalent to that of the fluid which normally fills the space between said plates.

5. A capacitor for measuring the dielectric constant of various fluids in which it may be immersed from time to time, comprising cylindrical supporting means extending upward from the bottom of a container for fluid, the dielectric constant of which is to be measured, opposite polarity plates of conducting material carried by said supporting means adjacent to the lower extremity thereof and normally completely immersed in the fluid in said container, said plates being (a) of arcuate cross-section, (b) located opposite one another on the interior of said supporting means and (c) electrically insulated from one another; means providing free passage for the fluid in said container to the space between said plates, so that said plates will normally be completely immersed in said fluid when the level thereof is sufficiently high to reach the top of said plates; a substantially cylindrical float means arranged for free movement under the control of the level of said fluid in said container, and means guiding said float means for substantially vertical movement concentrically within said supporting means, said float means being of a size substantially to fill the space between said plates when the fluid flows out from between said plates, and said float means having a dielectric constant in the same range of values as the values of the dielectric constants of the fluids being measured from time to time.

6. A capacitor in accordance with claim 5, in which said float means comprises a hollow, substantially cylindrical body having an opening into the interior thereof so that said float means may be filled with a material for predetermining the dielectric constant thereof as aforesaid, and means for closing said opening to maintain said float means in a sealed condition.

7. A capacitor for measuring the dielectric constant of various fluids in which it may be immersed from time to time, comprising fixed, opposite polarity plates, each formed as a substantially cylindrical member of conductive material and which are concentrically arranged and are spaced apart by an annular space, means mounting said plates adjacent to the bottom of a container which is usable to contain various fluids from time to time, said plates being so located with respect to said container that they are normally completely immersed in the fluid in the container with the fluid occupying the annular space therebetween, so that the capacitance of the capacitor formed by said plates will be a function of the dielectric constant of said fluid; an annular, substantially cylindrical float means of a size such as substantially to fill said annular space when said float means is at its lowermost position, said float means being buoyed up by the fluid in said container and controlled in its vertical position by the level of such fluid, and means guiding said float means for substantially solely vertical movement, so that said float means will enter into and occupy the annular space between said plates only when the fluid flows out from between them, said float means having a dielectric constant in the same range of values as the values of the dielectric constants of the fluids which are to be measured from time to time by said capacitor.

References Cited in the file of this patent

UNITED STATES PATENTS 2,724,273   Sontheimer _____ Nov. 22, 1955